United States Patent
Trillo

(10) Patent No.: US 7,263,797 B1
(45) Date of Patent: Sep. 4, 2007

(54) FISHING LURE WITH TENSION ACTIVATED LIGHT

(76) Inventor: Mark A. Trillo, 307 Redwood, Woodacre, CA (US) 94973

( * ) Notice: Subject to any disclaimer, the term of this patent is extended or adjusted under 35 U.S.C. 154(b) by 191 days.

(21) Appl. No.: 10/952,994

(22) Filed: Sep. 30, 2004

Related U.S. Application Data

(63) Continuation-in-part of application No. 10/612,027, filed on Jul. 3, 2003, now abandoned, which is a continuation-in-part of application No. 10/118,643, filed on Apr. 8, 2002, now abandoned.

(51) Int. Cl.
*A01K 75/02* (2006.01)
(52) U.S. Cl. ............................................. 43/17.6
(58) Field of Classification Search ................ 43/17.6, 43/17.5, 42.02
See application file for complete search history.

(56) References Cited

U.S. PATENT DOCUMENTS

| | | | | |
|---|---|---|---|---|
| 2,550,988 A | * | 5/1951 | Flournoy | 43/17.6 |
| 3,001,315 A | * | 9/1961 | Zimmermann | 43/17.6 |
| 3,310,902 A | * | 3/1967 | Godby | 43/17.1 |
| 3,828,177 A | * | 8/1974 | Day | 43/17.6 |
| 4,250,650 A | * | 2/1981 | Fima | 43/17.6 |
| 5,299,107 A | * | 3/1994 | Ratcliffe et al. | 362/158 |
| 5,638,631 A | * | 6/1997 | Guerri et al. | 43/42.33 |
| 5,822,909 A | * | 10/1998 | Kalagian | 43/17.6 |
| 6,807,766 B1 | * | 10/2004 | Hughes et al. | 43/17.6 |
| 6,922,935 B2 | * | 8/2005 | Yu | 43/17.6 |
| 2001/0013193 A1 | * | 8/2001 | Schultz et al. | 43/17.6 |
| 2004/0244265 A1 | * | 12/2004 | Miyata et al. | 43/17.6 |

\* cited by examiner

*Primary Examiner*—Kurt Rowan
(74) *Attorney, Agent, or Firm*—John D. Gugliotta, PE, Esq

(57) ABSTRACT

A fishing lure with an integral light source and fiber optic strands is provided designed to attract more fish. A splay of short fiber optic strands leave the rear of the lure and camouflage a fishing hook. The fiber optic strands are gathered to a single point inside of the lure. A light-emitting diode (LED) is placed next to this point which allows visible light to travel down the fiber optic strands and exit from the end of the strand thus producing a display of light designed to attract fish. The LED is powered by a small watch-type battery and is controlled by a tension-activated switch at the front of the lure. Whenever tension is applied to the lure by the fishing line, the circuit is closed and the LED illuminates. If tension is removed by slack in the line, the circuit is opened and the LED extinguishes.

18 Claims, 4 Drawing Sheets

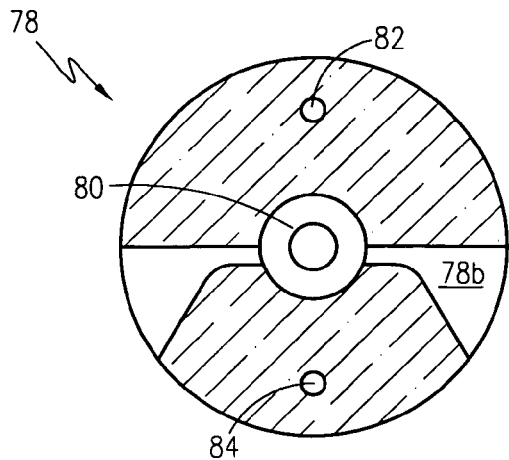
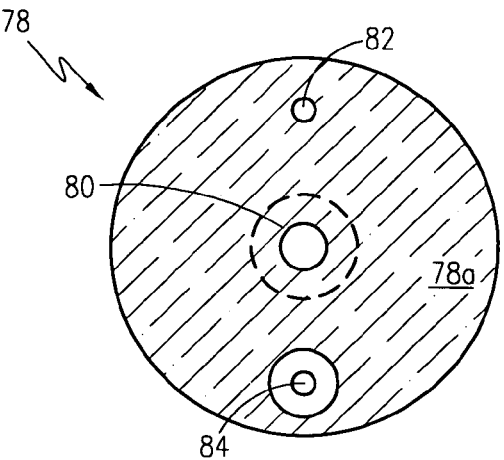
*Fig. 6a*  *Fig. 6b*
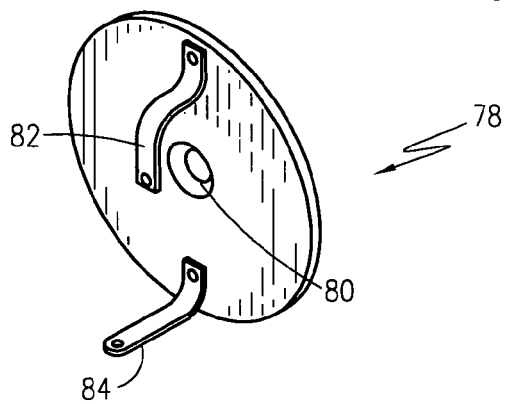
*Fig. 6c*
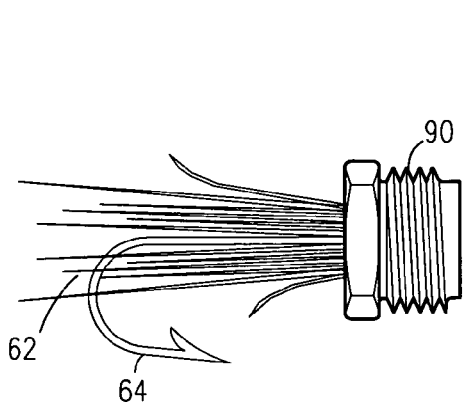
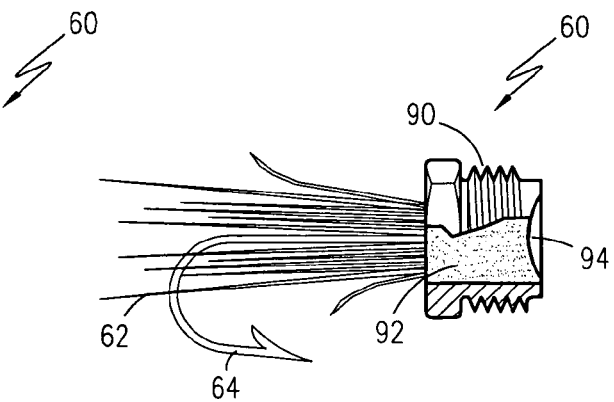
*Fig. 7a*  *Fig. 7b*

FISHING LURE WITH TENSION ACTIVATED LIGHT

RELATED APPLICATIONS

The present application is a Continuation-In-Part of U.S. patent application Ser. No. 10/612,027 filed on Jul. 3, 2003, which was a Continuation-In-Part of U.S. patent application Ser. No. 10/118,643, filed on Apr. 8, 2002, both hereinafter abandoned.

BACKGROUND OF THE INVENTION

1. Field of the Invention

The present invention relates generally to fishing line activity detector and fish attractant and, more particularly, to a fishing lure having a tension activated light.

2. Description of the Related Art

The technology used by anglers to catch fish has become increasingly complex in nature. Fishermen no longer rely on the traditional hook and worm approach to attract fish. Instead, a broad range of products are available, designed to aid the fisher to catch more fish quickly. One of the more popular aids is that of specialized lures designed to attract a higher rate of fish, thereby increasing the strike rate for a fisher. In keeping with these modern trends, there is a constant need for new and different fishing lures that provide a competitive edge when attracting fish. Many fish are attracted to various types of light, especially reflections that come from body of fish prey. Consequently, a need has been felt for providing a fishing lure that can be lighted upon application of line tension to the lure, illuminating the tail and serving both as a fish attractant and a activity detector.

SUMMARY OF THE INVENTION

It is therefore an object of the present invention to provide an improved lighted fishing lure.

It is a feature of the present invention to provide an improved fishing lure that is illuminated upon application of line tension.

It is a further feature of the present invention to provide an improve fishing lure that transmits illumination through the tail and the fibers coupled to the tail.

It is a further feature of the present invention to provide an improved fishing lure that includes a removably affixed tail interchangeable with other varied tails.

Briefly described according to one embodiment of the present invention, a fishing lure with an integral light source and fiber optic strands is provided so as to attract more fish. A splay of short fiber optic strands of various lengths leave the rear of the lure and camouflage a fishing hook. The fiber optic strands are gathered to a collar that is insertable into a rear end of the lure body. A light-emitting diode (LED) is adjacent to the rear end and allows visible light to travel down the fiber optic strands and exit from the end of the strand thus producing a modulated display of light designed to attract fish. The LED further acts to indicate line activity by a striking fish or other object. The LED is powered by a small watch-type battery and is controlled by a tension-activated switch at the front of the lure body. As tension is applied to the lure by the fishing line, either by a striking fish or a fisher, the circuit is closed and the LED illuminates. If tension is removed by slack in the line, the circuit is opened and the LED returns to a non-illuminated state.

In this manner, the fisher is able to produce a flashing light display designed to attract even more fish.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 6a is the reverse side of the nose switch board;

FIG. 6b is the obverse side of the nose switch board;

FIG. 6c is a perspective view of the nose switch board;

FIG. 7a is a side view of the tail;

FIG. 7b is a partial cutaway of the tail; and

DESCRIPTION OF THE PREFERRED EMBODIMENTS

The best mode for carrying out the invention is presented in terms of its preferred embodiment, herein depicted within the FIGS. 1 through 8.

1. Detailed Description of the Figures

Figure 1:
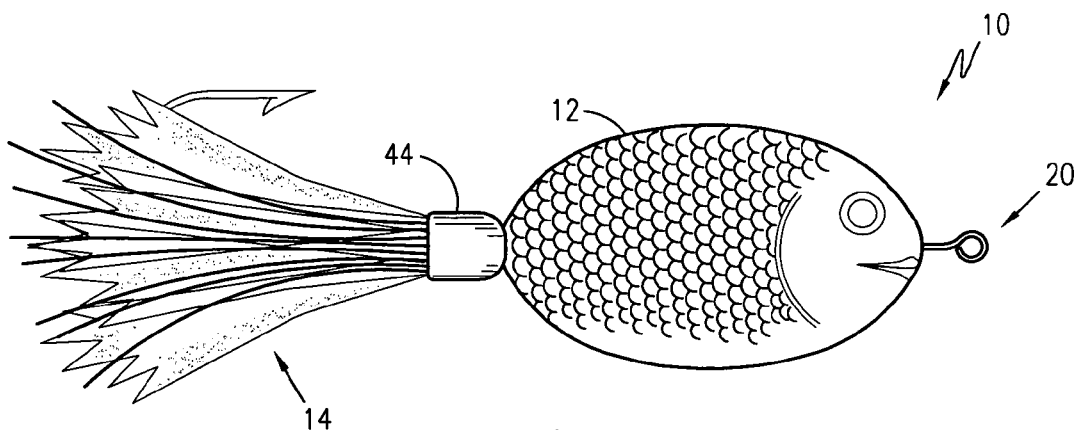
FIG. 1 is a side plan view of a tension activated lighted fishing lure according to the preferred embodiment of the present invention.
Figure 2:
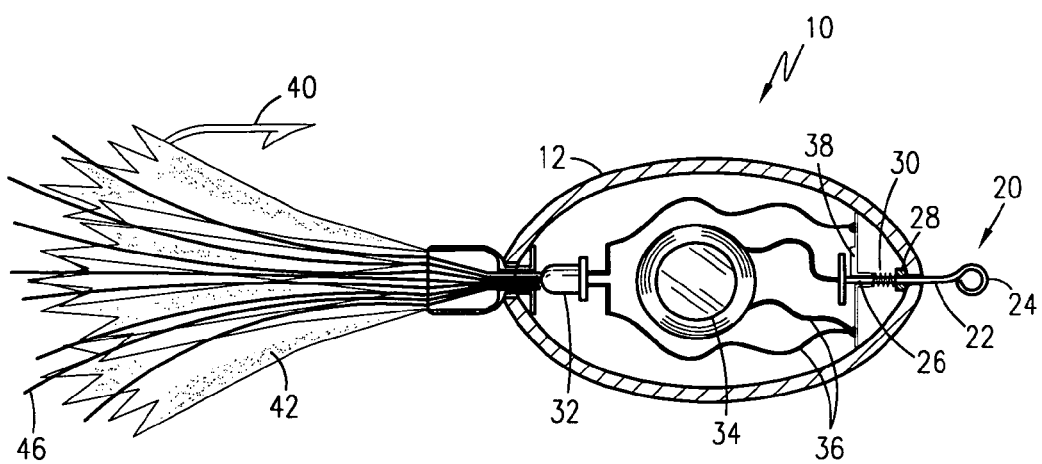
FIG. 2 is a cross sectional view thereof.
Figure 3:
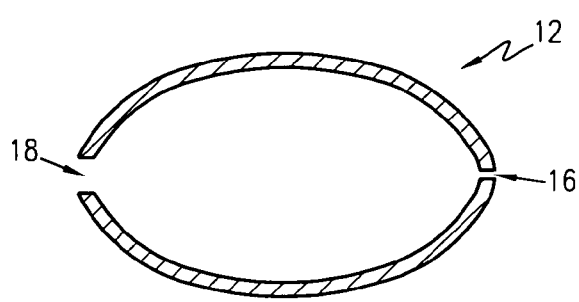
FIG. 3 is a cross sectional view illustrating only the body with orifices.

Referring now to FIG. 1 through FIG. 3, a fishing lure having a tension activated light 10 is shown in accordance with a preferred embodiment of the present invention. The fishing lure 10 generally comprises a body 12 and a tail 14, the tail 14 being removably attached to a rear portion of body 12. The lure 10 has the general form of standard elongated fishing bait, including other fish, minnows, insects or other similar material. A fish-type form is depicted in the figures as an example.

The body 12 comprises a structurally rigid and sturdy exterior intended to withstand repeated use and the various environmental elements in which people fish, including fresh-water and salt-water environs and temperature extremes, such as ice fishing. It is envisioned that the exterior is manufactured from rigid materials, such as castable urethane or another similar substance. The exterior surface of the body 12 is envisioned as having a variety of aesthetic effects, including the appearance of eyes, mouth, gills, scales and other suitable surface features observable on fish-type bait. The body 12 is elongated and comprises a pair of orifices 16 and 18 (see FIG. 3), the orifices 16 and 18 are aligned substantially along an axis that corresponds to an equator about the body 12. The first orifice 16 provides ingress and egress to attachment means 20 (described in greater detail below). The second orifice 18 provides ingress and egress to tail 14 for removable attachment and detachment, allowing for the interchangeability of other alternate tails 14'. The interior of body 12 is substantially hollow to accommodate the electrical circuitry and illumination source (LED) necessary to provide illumination to the tail 14.

Attachment means 20 is envisioned to have a variety of configurations suitable for securing the lure 10 to a fishing line. As depicted in the preferred embodiment, attachment means 20 comprises a substantially elongated shaft 22 terminating at two ends, one end comprising an eyelet 24 and an opposing end comprising a base 26. A portion of the shaft 22 and the entire eyelet 24 project outwardly from body 12 through first orifice 16. An elastomeric O-ring 28 is positioned on the interior of body 12 and lies adjacent to first orifice 16, permitting shaft 22 to pass therethrough. The O-ring 28 acts to seal the interior of body 12, including the electrical circuitry and attendant components, from ingress of water or other foreign substances that might damage the body 12 and/or the electrical circuitry. Intermediate to the O-ring 28 and the base 26 is an outwardly biased return spring 30. When a force is applied so that the base 26 is drawn toward the O-ring 28, the return spring 30 is compressed (storing potential energy), and once the force is removed, the stored potential energy resiliently returns the spring 30 to the outwardly biased position. Attachment means 20 is threadably adjustable about return spring 30, so that clockwise rotation of shaft 22 either tightens or loosens the tension on return spring 30, and counterclockwise rotation of shaft 22 provides opposite adjustable tension. By adjusting the tension of return spring 30, a user can adjust the sensitivity and frequency of illumination provided by the fishing lure 10. Specifically, and only by way example, if a user is fishing waters with fish particularly attracted to illumination, the tension on return spring 30 may be lessened so that only light force is necessary to cause intermittent illumination.

The internal circuitry comprises a light emitting diode (LED) 32 adjacently positioned to the second orifice 18. The LED 32 is electrically coupled to a battery 34 via an electrical wire circuit 36. The LED 32 and battery 34 are further electrically coupled with a switch 38. The switch 38 engages base 26 (via direct physical contact) and completes an electrical circuit so that the LED 32 is activated, thereby illuminating tail 14. Disconnection or disengagement of base 26 and switch 38 (release of contact and action of return spring 30 to disconnect base 26 and switch 38) deactivates electrical communication, thus LED 32 returns to a non-illuminated state.

Figure 8:
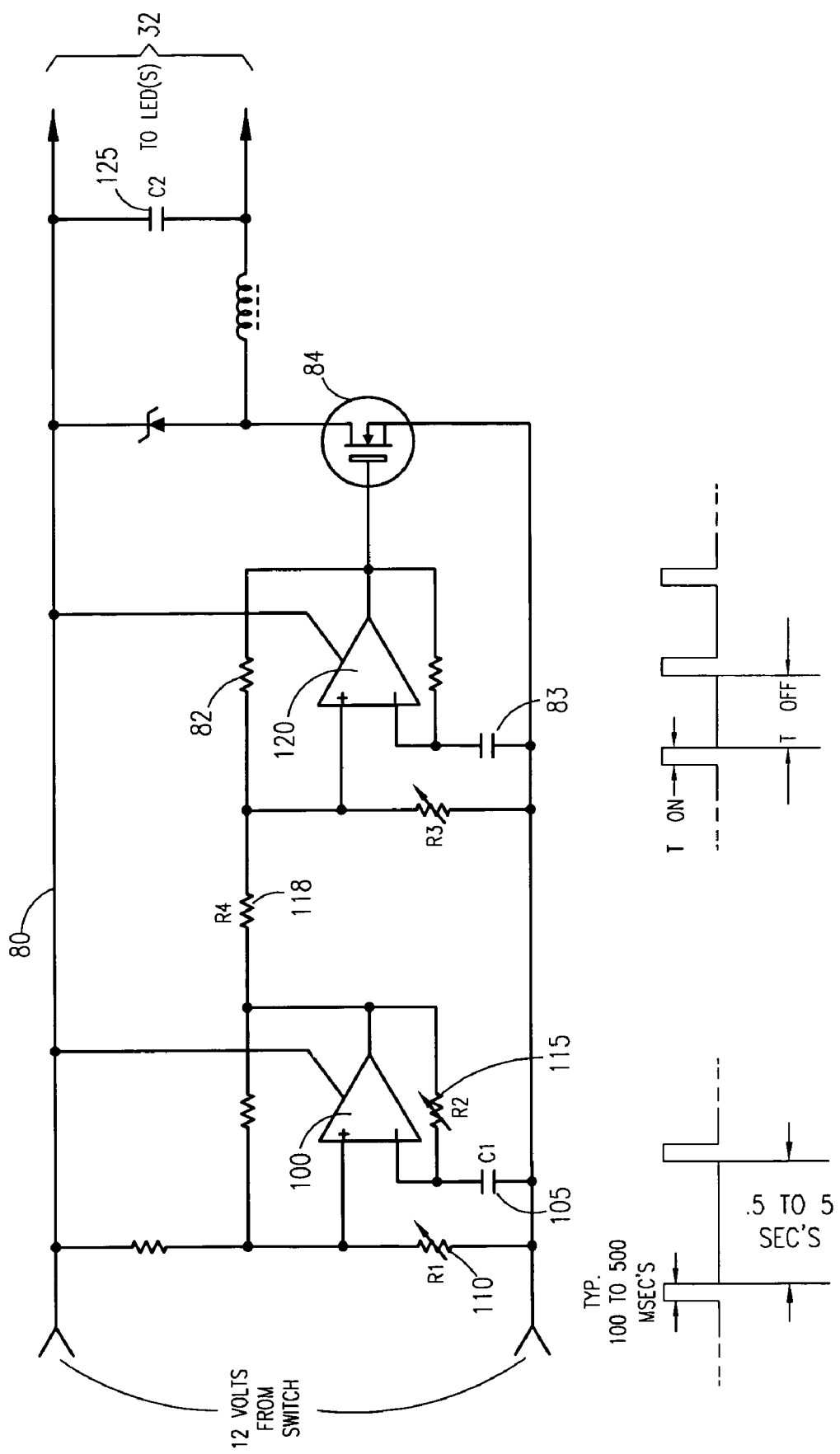
FIG. 8 is a schematic of the electronics of the lure.

The LED 32 is envisioned as available in a variety of colors, including yellow, red and/or green. The LED 32 is also envisioned as having solid state circuitry. It is anticipated that the internal circuitry is capable of modulating the LED 32 in various manners, and from a preselected form or pattern. For purpose of disclosing one such enablement, as depicted in FIG. 8 the. Modulation of voltage supplied to the LED(s) 32 integrated circuit (IC1) 100 and immediately connected capacitor C1 105 and resistors including R1 110 and R2 115 for varying the modulation pattern of voltage at point "A" 118 followed by integrated circuit (IC2) 120 and their immediately connected components to produce a regulated voltage when point "A" 118 is high; and finally a capacitor C2 125 to produce a fading action at the LED(s) 32, rather than a sharp drop in illumination. This functionality can be accomplished for various numbers of LED's in series, but the exact voltage will depend upon the colors selected and numbers of LED's.

The tail 14 comprises at least one fishing hook 40 centrally placed within a plurality of tail fibers 42. The tail fibers 42 are formed from feathers, fibrous strands, or other similar materials. The tail fibers 42 are gathered at a collar 44, and anticipated as being of various lengths. The collar 44 is removably attachable to body 12 through second orifice 18, thereby permitting interchangeability of tails 14 or 14'. The collar 44 may have a variety of configurations, including releasable ball bearings, resiliently returnable projections, snap fasteners, or other similar objects suitable for generating frictional impingement of tail 14 within said body 12 via the second orifice 18. It is envisioned that the tail 14 is coordinated with body 12 in aesthetic appearance. A second O-ring 48 may be provided to provide a seal about second orifice 18. A plurality of fiber optic strands 46 are intermingled with tail fibers 42, with one end of each fiber optic strand 46 lying adjacent to LED 32 so as to transmit light produced by LED 32 down the strand and visible to targeted fish. The fiber optic strands 46 are gathered at a collar 44, and anticipated as being of various lengths. A plurality of fishing hooks 40 may be included as an alternative to a single hook 40.

Referring now to FIG. 4 through FIG. 7b, an exemplary embodiment of the lure 50 is shown. The lure 50 comprises an elongated body 52 having a first end 54 and a second end 56 (opposite the first end 54). Attachment means 58 is coupled to the first end 54. Attachment means 58 for coupling the lure 50 to a fishing line. A tail 60 is coupled to the second end 56, the tail 60 having tail fibers 62 formed from feathers, fibrous strands, fiber optic strands, a combination of feathers and strands or other similar materials and a hook or hooks 64.

Each end 54 and 56 possesses an elastomeric annular ring 96 and 98, respectively, positioned internally or inferior to the threads of attachment means 58 and tail 60, respectively. The rings 96 and 98 function to seal the internal components from external elements, including debris and water, and to generate a tight seal between means 58 and tail 60 at respective ends 54 and 56.

Referring to FIG. 7a and FIG. 7b, the tail 60 is depicted having a threads 90 for installation and removal of the tail 60 from the second end 56 of body 52. As shown in FIG. 7b, a breakaway view of the tail 60, a clear epoxy 92 is used to embed the tail fibers 62 in the tail 60, including any variation of feathers, fibrous strands, fiber optic strands or other similar materials used for decoration and/or delivery/transmission of light from light source 68. The epoxy 92 has a concavity 94 formed at an end adjacent the light source 68 when the tail 60 is fully seated onto second end 56 of body 52.

The body 52 houses the electrical communication between the attachment means 58, an energy source 66 and a light source 68, described in greater detail below.

Figure 5:
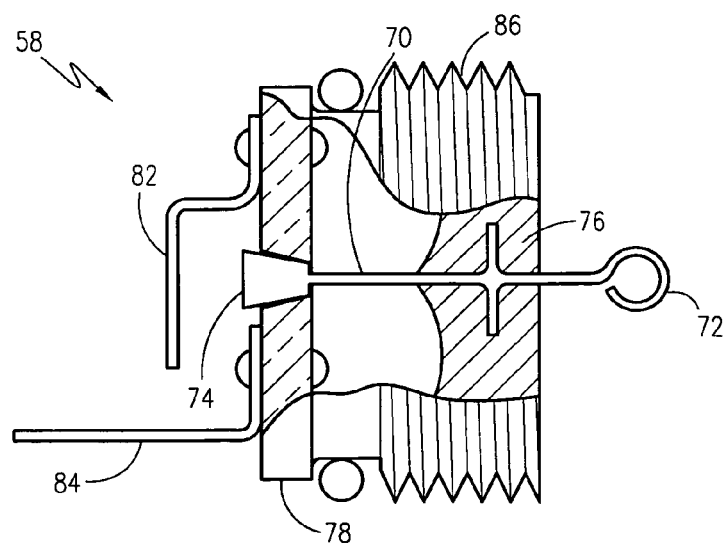
FIG. 5 is a partial cutaway of the attachment means.

Referring to FIG. 5, attachment means 58 comprises an elongated shaft 70 terminating in an eyelet 72 at an end and a tapered switch contact 74 at an opposing end. The eyelet 72 is used for direct attachment to a fishing line, usually by passing the line through the eyelet 72 and forming a knot in the line, although other ways are envisioned as well. The shaft 70 resides in a casting urethane material 76, the urethane 76 deformable and returnably resilient for acting as a spring tension device for the attachment means 58 when force is applied on the eyelet 72 in a direction away from the body 52. The tapered switch contact 74 is disposed or passes through a nose switch board 78. The nose switch board 78 is positioned within the body 52 and has a tapered aperture 80 formed about the center of the board 78, a battery spring contact 82 and an alignment cleat 84. The aperture 80 traverses the width of the board 78, with a narrow width on the obverse 78a of the board 78 and a wider width on the reverse 78b of the board 78. The battery spring contact 82 and cleat 84 depend from the reverse 78b side of the board 78 and communicate with other components housed by the body 52, as will be described in more detail. Attachment means 58 further includes a threaded or cross-groove structure 86 to allow for easy installation and extraction when necessary, allowing the user access to the internal components of the body 52.

The tapered aperture 80 of the nose switch board 78 is tapered in substantially a similar shape as the tapered switch contact 74 so that the contact 74 does not contact the perimeter of the aperture 80 while in a relaxed and disengaged position. When the eyelet 72 receives a force applied by a striking fish, the shaft 70 is urged outward from the body, thus urging the tapered switch contact 74 into physical communication with perimeter of the aperture 80 of the nose switch board 78. The nose switch board 78 is electrically coupled with circuit components (such as transistors, capacitors, inductors, resistors, etc.), an energy source 66 and a light source 68, thus, when the tapered switch contact 74 engages the perimeter of the tapered aperture 80, a circuit is completed and light is transmitted from the light source 68 and through the tail.

The battery spring contact 82 engages an energy source 66, in this embodiment depicted as a battery with the positive end (+terminal pole) contacting the battery spring contact 82 directly. The battery 66 is intermediately disposed between the attachment means 58 and the tail 60, and in particular, is intermediately disposed between the battery spring contact 82 and a printed circuit board 86 and light source 68 combination at the opposing end. The cleat 84 engages a surface of the printed circuit board 88 for electrically communicating with the electrical components of the lure 50, thus signaling transmission of light from light source 68 through the tail 60 and corresponding tail fibers.

Figure 4:
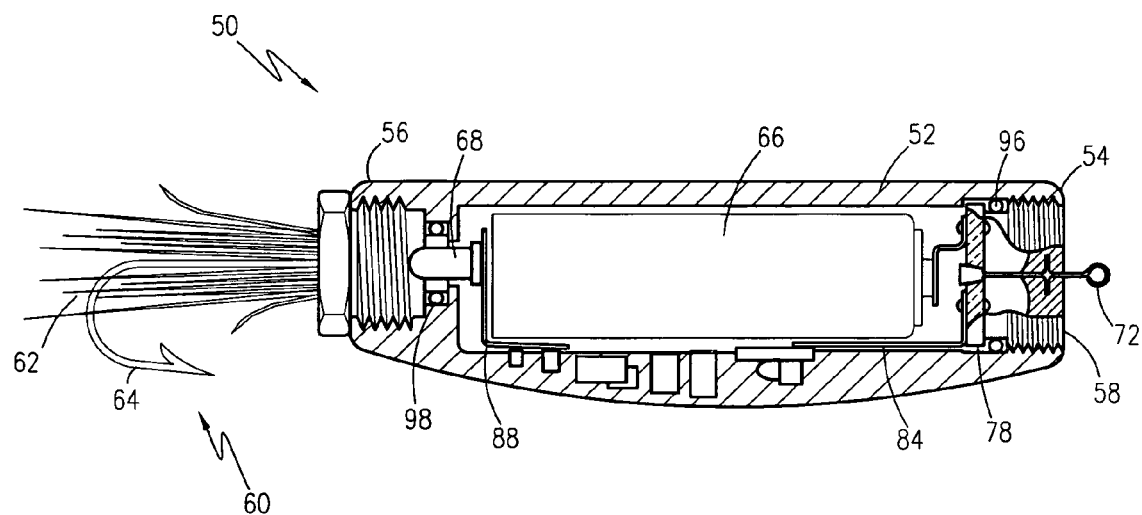
FIG. 4 is a partial cutaway of the body of the lure.

As seen in FIG. 4 and FIG. 8, in particular, the circuitry is positioned along a printed circuit board 88, and includes a number of resistors, integrated circuits, transistors and capacitors, and may include other such components. A light source 68, shown as a single light emitting diode (LED), is mounted to the printed circuit board 88. The LED and printed circuit board 88 are positioned adjacent the tail 60 so that light generated from the LED is transmitted through the tail 60 and down the fibers 62 to visually attract fish attracted to light. As depicted in FIG. 8, and described above, the components allow for the modulation of the light generated by the light source 68, and includes coupling to means for changing the modulation and programming the modulation to a programmed or customized pattern of the user's choosing. Other illumination sources 68 envisioned include incandescent bulbs and other similar light transmitting devices.

2. Operation of the Preferred Embodiment

In accordance with a preferred embodiment of the present invention, the lure 10 is used as a standard fishing lure by attaching the eyelet 24 to a fishing line (not shown). As seen in FIG. 1, after casting, each time a force (tension) is applied to the lure 10, either by a striking fish or the tug of the fisher, the switch 38 will close, thereby illuminating the fiber optic strands 46 intermingled and camouflaged within tail 14. In reaction to the applied force, the base 26 is brought into contact with switch 38 (compressing return spring 30) and closing an electrical circuit between LED 32 and battery 34. The illumination generated by LED 32 is transmitted through fiber optic strands 44. Thereafter, the return spring 30 returns base 26 to a non-contact position in relation to switch 38, thereby extinguishing the illumination generated by LED 32.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A fishing lure comprising:

generally rigid elongated housing comprising a first orifice and a second orifice aligned substantially along an axis that corresponds to an equator about said housing, said first orifice providing ingress and egress to an interior cavity housing an attachment means and said second orifice providing ingress and egress to said interior cavity housing a tail for removable attachment and detachment, said interior cavity housing being substantially hollow to accommodate electrical circuitry and an illumination source for providing illumination to said tail, wherein said housing is formed of castable material and has an exterior surface having eyes, mouth, gills, and scales;

said attachment means affixed to said housing;

a substantially elongated shaft terminating at two ends, one end comprising an eyelet and an opposing end comprising a base, said shaft retained within said housing and said eyelet project outwardly from said housing through said first orifice;

an elastomeric O-ring positioned on the interior of said housing and adjacent to said first orifice for permitting said shaft to pass therethrough;

wherein when a force is applied so that said base is drawn toward said O-ring, a return spring urging against said base is compressed, and once the force is removed, said return spring resiliently returns to an outwardly biased position;

said attachment means threadably adjustable about said return spring so that clockwise rotation of shaft tightens the tension on return spring and counterclockwise rotation of shaft provides opposite adjustable tension; and said illumination source comprising a light emitting diode being in electrical communication with a battery via an internal electric circuit housed within said rigid housing.

2. The fishing lure of claim 1, wherein said housing further forms a tail section that further comprises a fishing hook centrally placed within tail fibers selected from the group consisting of feathers, fibrous strands and fiber optic strands.

3. The fishing lure of claim 2, wherein said tail comprises:

at least one fishing hook centrally placed within a plurality of tail fibers;

said tail fibers gathered at a collar, said collar removably attachable to said housing through said second orifice, thereby permitting interchangeability of tails;

a second O-ring to provide a seal about said second orifice; and a plurality of fiber optic strands intermingled with said tail fibers and having one end of each fiber optic strand lying adjacent to an LED so as to transmit light produced by said LED down said strand and visible to targeted fish.

4. The fishing lure of claim 3, wherein said plurality of fiber optic strands are of various lengths such as to provide a multiplicity of ends that create a dazzling and attractive array of light spots at said ends.

5. The fishing lure of claim 2, wherein said tail fibers are capable of hiding at least one fishing hook.

6. The fishing lure of claim 2, wherein said electrical circuitry is capable of modulating said light emitting diode.

7. The fishing lure of claim 6, further comprising a means of changing said light modulation.

8. The fishing lure of claim 6, further comprising means of programming said light modulation to a preselected pattern.

9. A fishing lure comprising:
   an elongated body having a first end and a second end;
   attachment means affixed to a shaft, said shaft being elongated and terminating in an eyelet and a tapered switch contact at opposing ends, said eyelet coupled to a fishing line, said attachment means coupled to said first end;
   a tail having tail fibers and at least one hook, said tail coupled to said second end;
   a nose switch board having a tapered aperture, a battery spring contact and an alignment cleat, said nose switch board disposed in said body adjacent said attachment means, said battery spring contact and said alignment cleat depending from a reverse side of said nose switch board;
   said shaft passing through said tapered aperture, wherein said tapered switch contact communicates with said tapered aperture on said reverse side of said nose switch board;
   a printed circuit board housed within said elongated body and communicating with said alignment cleat, said printed circuit board having integrated circuit and a means for regulating output voltage and actuating timing functions of an illumination source disposed on said printed circuited board, and
   a battery communicating with said battery spring contact; wherein said eyelet receives a force and urges said tapered switch contact into communication with said tapered aperture, an electrical circuit is completed and said light is transmitted through said tail fibers.

10. The fishing lure of claim 9, wherein said body is formed of castable urethane and has an exterior surface having eyes, mouth, gills, and scales.

11. The fishing lure of claim 9, wherein said attachment means has threads for installation and extraction of said attachment means from said body.

12. The fishing lure of claim 9, wherein said shaft traverses a layer of urethane material, said material deformable and returnably resilient in response to force applied to said eyelet, said shaft and said tapered switch contact, thus returning said tapered switch contact to a non-engaged position after the force is removed.

13. The fishing lure of claim 9, wherein said tail has threads for installation and extraction of said tail from said body.

14. The fishing lure of claim 9, wherein each one of said tail fibers is a member selected from the group consisting of feathers, fibrous strands and fiber optic strands.

15. The fishing lure of claim 14, wherein said tail fibers are secured to said tail by an epoxy.

16. The fishing lure of claim 9, wherein said illumination source is at least one light emitting diode (LED).

17. The fishing lure of claim 9, wherein said illumination source is a plurality of light emitting diodes (LEDs).

18. The fishing lure of claim 9, wherein said illumination source is an incandescent bulb.

* * * * *